July 29, 1952  J. T. HINTON  2,604,799
AUTOMATIC HYDRAULIC TRANSMISSION
Filed June 2, 1949  4 Sheets-Sheet 1
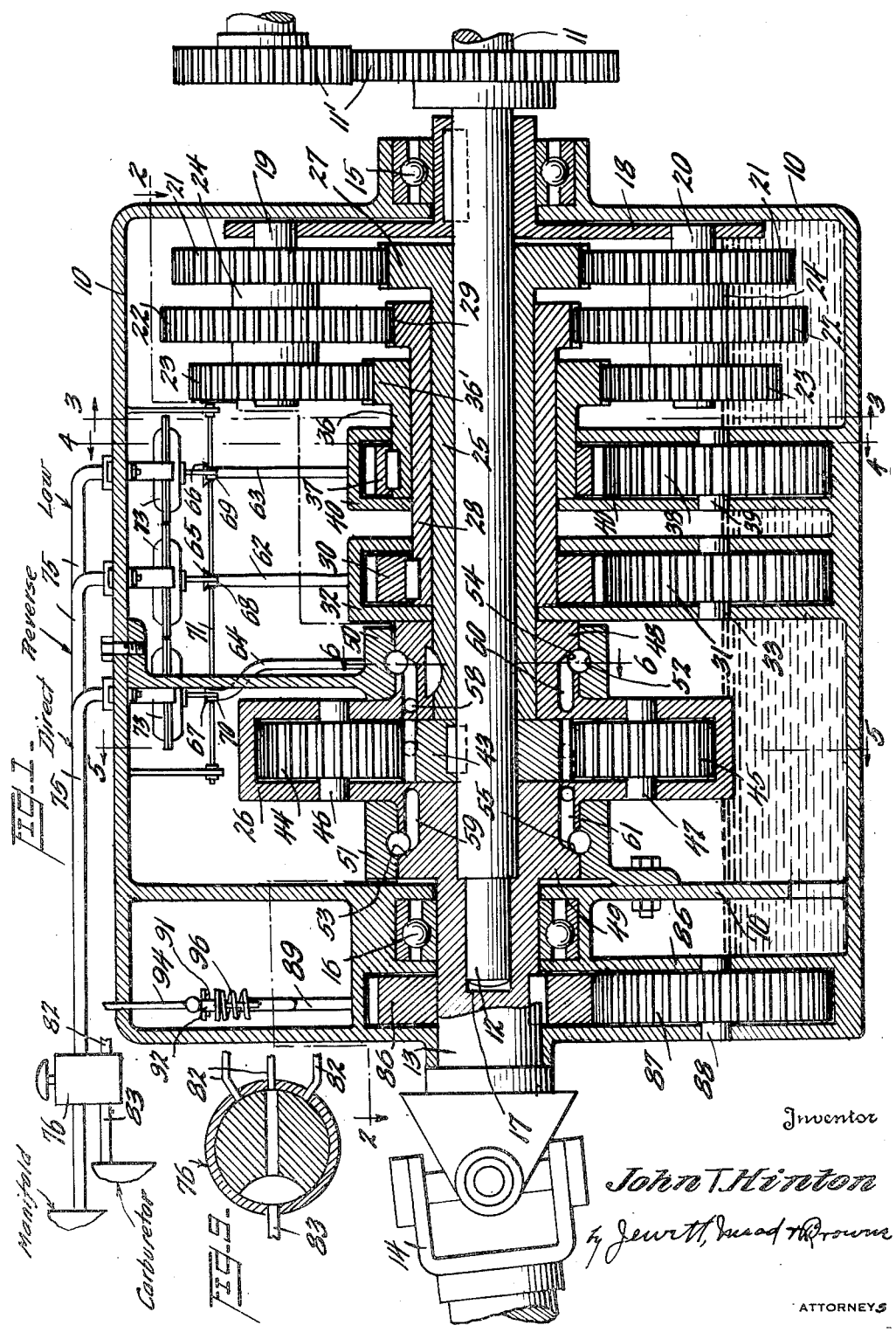
Inventor
John T. Hinton
by Jewett, Mead & Brown
ATTORNEYS

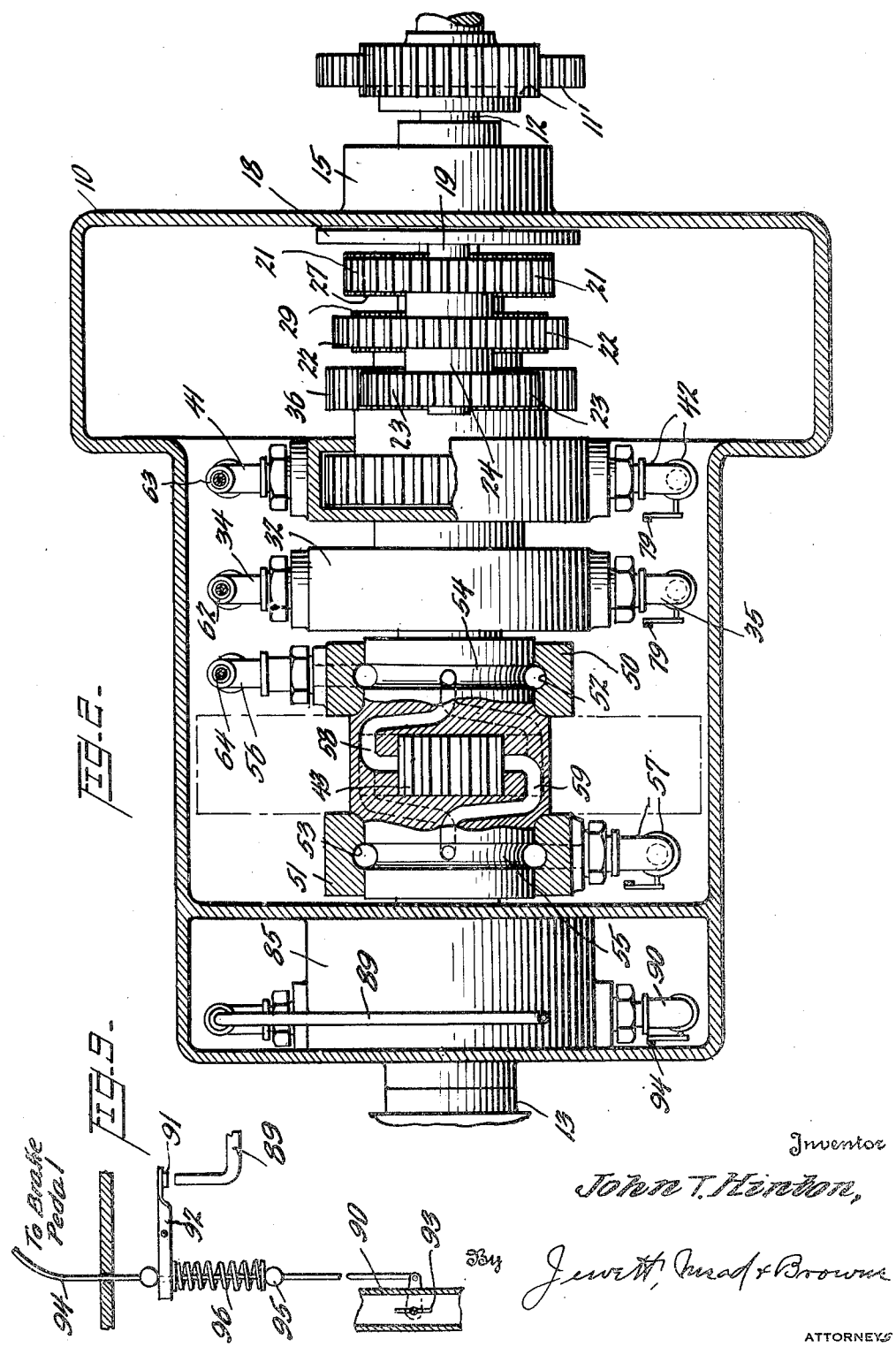

July 29, 1952

J. T. HINTON 2,604,799

AUTOMATIC HYDRAULIC TRANSMISSION

Filed June 2, 1949

Inventor

John T. Hinton,

By Jewett, Mead & Browne

ATTORNEYS

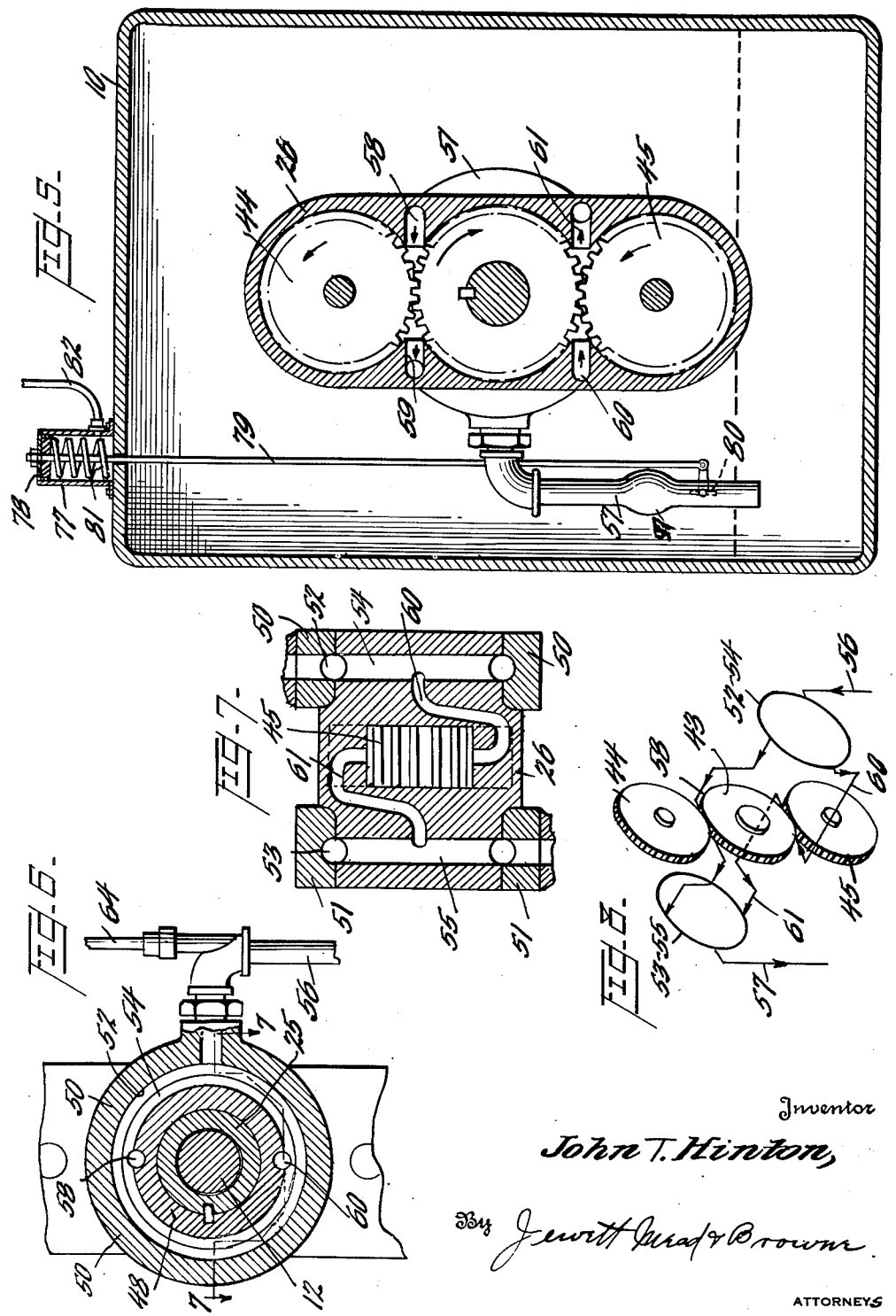

Patented July 29, 1952

2,604,799

UNITED STATES PATENT OFFICE 2,604,799

AUTOMATIC HYDRAULIC TRANSMISSION

John T. Hinton, Macon, Ga.

Application June 2, 1949, Serial No. 96,777

2 Claims. (Cl. 74—766)

The invention relates to transmissions and has as an object the provision of an hydraulic transmission to provide an improved graduation and control of the power transmitted to a driven shaft.

It is an object of the invention to provide mechanism particularly applicable to motor cars, for fully automatic operation.

It is a further object of the invention to provide a novel form of reverse mechanism.

Further objects are: to provide a simple mechanism to perform the required operation; to improve the controls of devices of this character; to provide a variable speed drive including reverse drive having no possibility of gear clash; and to provide a mechanism which is fully automatic and can therefore be used to drive a motor car without a clutch.

Further objects will appear from the following description when read in connection with the accompanying drawing showing an illustrative embodiment of the invention and wherein:

Fig. 1 is a central vertical longitudinal section;

Fig. 2 is a horizontal section on broken line 2—2 of Fig. 1;

Figs. 3, 4, 5 and 6 are vertical transverse sections on the corresponding section lines of Fig. 1;

Fig. 7 is a detail section on line 7—7 of Fig. 6;

Fig. 8 is a perspective diagrammatic view illustrating oil flow in the pump of Figs. 5, 6 and 7; and Fig. 9 is a vertical section through a vacuum operable valve.

Figure 4:
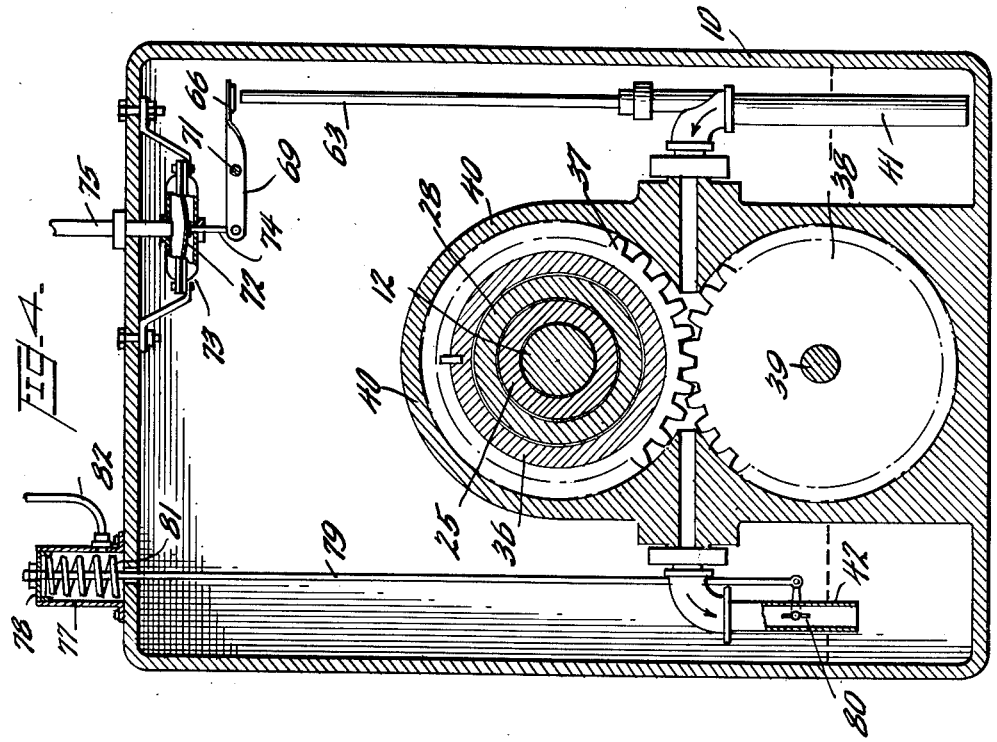
Figure 3:
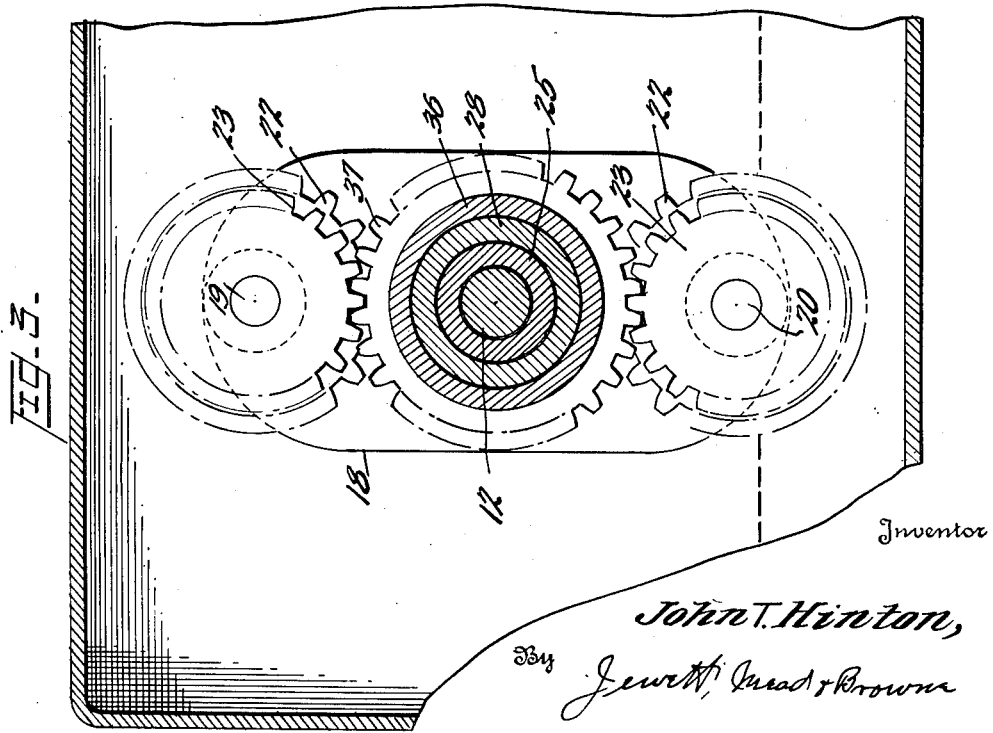

The device may be used for other purposes than operation of motor cars, but for convenience of disclosure will be described as for motor car transmission.

As shown the device comprises a casing 10 within which a body of oil is to be carried, the depth of which is at least sufficient to submerge the intakes of each of the pumps at any operating level of the vehicle.

A shaft 11 is to be driven by the motor of the vehicle, gears for a "starter" being shown at 11'. A driven shaft 13 is shown and a "universal" at 14 for connection to the usual propeller shaft. Non-friction bearings 15 and 16 are shown mounted in casing 10.

The shaft is shown as extended and supported in a recess 17 in shaft 13.

Keyed to shaft 12 there is shown a disc or plate 18. To drive planetary gears, shown as two in number, there are shown pins 19, 20 rigid with disc 18. The planetary gears shown as triple gears 21, 22, 23 are shown as integral or each mounted rigidly on a common hub 24 and are freely revoluble on pins 19, 20. While two triple gears are shown, it will be obvious that three or a greater number may be used. For balance of forces the pins 19 and 20 and the triple gears journaled thereon are desirably evenly spaced around shaft 12.

Freely revoluble on shaft 12 there is shown a sleeve 25 keyed to a pump housing 26 rigid with shaft 13. Rigid with sleeve 25 there is shown a gear 27, meshing with gears 21.

Freely revoluble on sleeve 25, there is shown a sleeve 28 rigid with low speed gear 29, and having keyed to its opposite end a pump gear 30 which is in mesh with a pump gear 31. The meshing gears 30 and 31 function as a gear pump and operate in a pump housing 32 rigidly mounted in casing 10, and the pump is provided with an intake 34 and an outlet 35.

Freely revoluble on sleeve 28 there is shown a sleeve 36 rigid with reverse gear 36' meshing with gears 23 and having a pump gear 37 keyed thereon which latter gear meshes with a pump gear 38 revolving on shaft 39 mounted in pump housing 40 provided with intake 41 and outlet 42.

Keyed on shaft 12 there is shown one gear 43 of a double pump in mesh with the remaining pump gears 44 and 45 which latter are mounted to revolve on shafts 46 and 47 respectively mounted in pump housing 26 which latter, as described above, revolves with propeller shaft 13.

To provide inlet and outlet passages for the double pump comprising gears 43, 44, 45 and pump housing 26, the hubs 48, 49 of the latter revolve in rings 50, 51 rigidly mounted in casing 10 and formed with circular semi-toroidal passages 52, 53 registering with semi toroidal passages 54, 55 formed in hubs 48, 49 respectively. The passage 52, 54 is shown (best in Fig. 2) as in communication with an intake pipe 56; and the outlet passage 53, 55 with an outlet pipe 57. The inlet of pump 43, 44 is shown as in communication with passage 52, 54 by a passage 58 and with outlet passage 53, 55 by a passage 59 the inlet of pump 43, 45 is correspondingly shown as in communication with inlet passage 52, 54 by passage 60 and with outlet passage 53, 55 by passage 61. The course of the fluid through the double pump is indicated diagrammatically by Fig. 8.

It will be understood that the casing 10 and the pump housings 26, 32 and 40 must be formed each in two parts (not shown) bolted together with the gaskets necessary to make the structures oil tight and that the housings 32 and 40 will desirably be removably mounted in casing 10—all for purposes of assembly. Since these provisions can take many forms and are not necessary for an understanding of the invention, they are omitted from the drawings for purpose of simplification.

To prevent the operation of the oil pumps when operation is not wanted, the intake pipes 34, 41 and 56 are respectively provided with vent pipes 62, 63, 64, the openings to the atmosphere of which may be closed by caps 65, 66, 67 mounted on levers 68, 69, 70, pivoted on a rod 71 rigidly supported in the casing.

To cause a pump to operate there is shown a diaphragm 72, Fig. 4, dividing the interior of a casing 73 into two parts, the diaphragm connects by a plunger 74 to a lever (69 as shown in Fig. 4). To move the diaphragm whereby to actuate the lever, the interior of the casing 73, at one side of the diaphragm is connected by a pipe 75 to the intake manifold of the motor, under control of a valve 76.

To introduce a resistance to operation of an oil pump which has its vent pipe closed, thereby to lock the gears of the pump or to cause them to perform work, there is shown a chamber 77 best shown in Fig. 5, equipped with a piston 78 connected by a rod 79 with a valve 80 in delivery pipe 57 (35, 42 or 57 as the case may be). The piston 78 is shown as urged to position to open the valve by a spring 81 which may be compressed by vacuum derived from the carburetor of the motor, by suction pipe 82 controlled by a second portion of valve 76. The pipes 82 for control of each pump are connected to valve 76, and the pipe 83 from valve 76 to the carburetor is desirably connected to the latter just above the butterfly valve thereof.

Operation

When valve 76 is in a neutral position no suction is applied to any of the three diaphragms 72 which are associated with the respective vent pipes 62, 63 and 64 shown in Fig. 1. As mentioned heretofore, each of these vent pipes 62, 63 and 64 has associated therewith, respectively, caps 65, 66 and 67 which are mounted on levers, respectively, 68, 69 and 70, all of these levers being pivoted on a rod 71 which is rigidly supported in the casing 10. The weight of a particular cap and lever assembly, as for example the cap 66 and lever 69 shown in Fig. 4, is such that the cap is open when no suction is applied to the diaphragm 72 associated therewith. Even when valve 76 is moved to a suction applying position, the weight of these parts 66 and 69 is such as to still maintain the cap 66 open as long as the engine is merely idling. Thus, the engine may idle without pump action despite the fact that the valve 76 has been moved to a suction applying position.

However as the engine speeds up suction from the intake manifold causes the connected diaphragm 72 to move in an upward direction thus, for the arrangement shown in Fig. 4, causing the lever 69 to pivot about rod 71 and bring cap 66 into closed position over vent pipe 63. Closure of the vent pipe causes actuation of the pump associated therewith. Furthermore, as suction increases in the carburetor of the engine the pump choke valve 80 which is positioned in the discharge outlet of the pump as shown in Fig. 4, will be actuated to cause the pump to apply increasing application of power to the corresponding gears to cause drive of the propeller shaft in the direction desired. The sequence of action just described relative to the pump arrangement shown in Fig. 4 applies also to the pumps associated with vent pipes 62 and 64 when the valve 76 is positioned to apply suction to the diaphragm 72 associated with these particular vent pipes. Of course, there is a pump choke valve 80 associated with each pump.

To provide a brake, an additional oil pump is shown housed in casing 85 rigid with casing 10. The braking pump is shown as comprising pump gear 86 keyed to shaft 13 and pump gear 87 revolving on shaft 88 journaled in housing 85. A vent pipe 89 is shown for the brake pump and an outlet 90.

To control the brake, a cap 91 is shown carried by a lever 92 and a choke valve 93 in the brake pump outlet. To actuate the vent cap and choke valve of the brake pump, a flexible shaft 94 is shown which may be connected to a brake pedal.

When the shaft 94 is pulled upon abutment 95 will actuate lever 92 through compression spring 96 to close vent 89 and further movement of shaft 94 will cause gradual closure of choke 93 to resist relative movement of the pump gears 86, 87 to retard revolution of shaft 13.

It will be seen that when the pump 43, 44, 45 is inoperative and drive is from gear 27 controlled by either the pump 30, 31 or 37, 38, that the sleeve 25, keyed to housing 26, becomes in effect a part of the driven shaft. Furthermore, the revoluble pump housing 26 may be retained with its enclosed pump for direct drive, at differing gear ratios, and the pump 30, 31, 32 may be omitted, sleeve 36 then being revoluble on sleeve 25 to provide sun gear 36' and planetary gears 23 for reverse drive.

The shock resulting from a sudden closure of the choke valve 80 may be objectionable in some fields of use. To cushion the shock there is shown an enlargement 97 of the outlet pipe 57 to form a chamber into which the liquid may back up momentarily when the choke valve is closed. This cushion may be used on all or some only of the pump discharge pipes including that of the brake pump 85.

Minor changes may be made in the physical embodiment of the invention without departing from the spirit thereof within the scope of the following claims.

I claim:

1. A power transmission device comprising in combination, a driving shaft, a driven shaft, a pump for transferring power from said driving shaft to said driven shaft, said pump having a pump gear housing integral with the driven shaft, a planetary pump gear journaled in said housing, and a sun pump gear keyed to said driving shaft, a sleeve revoluble on said driving shaft and keyed to said housing, a sun rigid with said sleeve, a planetary gear driven by the driving shaft and meshing with the sun gear on said sleeve, means to admit fluid to said pump, a first suction control means connected to said fluid admitting means to control the amount of fluid admitted to said pump, means to discharge fluid from said pump, and a second suction control means connected to said fluid discharge means to control the amount of fluid discharged from said pump.

2. A power transmission device comprising in combination, a driving shaft, a driven shaft, a planetary gear actuated by the driving shaft, a sun gear connected for actuation of the driven shaft, planetary gears respectively of greater and of less diameter than the first-named planetary gear and rigid with the latter, sleeves concentric with the driving shaft, each carrying sun gears respectively in mesh with said second-named planetary gears, a plurality of pumps corresponding in number to the number of sleeves, there being a pump associated with each sleeve and each pump having a pump housing and gear elements contained in said housing, the sleeve associated with a particular pump extending into the housing thereof and being connected to one of the gear elements contained in said housing, each of said pumps also having a vent means connected thereto, suction controlled means for selectively closing said vent means, means to admit fluid to each pump, means to discharge fluid from each pump, and suction controlled means connected to said fluid discharge means for controlling the amount of fluid discharged from each pump.

JOHN T. HINTON.

REFERENCES CITED

The following references are of record in the file of this patent:

UNITED STATES PATENTS

| Number | Name | Date |
|---|---|---|
| 1,078,042 | Ford | Nov. 11, 1913 |
| 1,619,876 | Mason | Mar. 8, 1927 |
| 1,883,685 | Gasterstadt | Oct. 18, 1932 |
| 1,935,400 | Junkers | Nov. 14, 1933 |
| 2,038,613 | Staats | Apr. 28, 1936 |
| 2,051,187 | Strigl | Aug. 18, 1936 |
| 2,174,344 | Sinderson | Sept. 26, 1939 |
| 2,200,566 | Szekely | May 14, 1940 |
| 2,278,181 | Lieberherr | Mar. 31, 1942 |
| 2,278,351 | Havens et al. | Mar. 31, 1942 |
| 2,377,199 | Adams et al. | May 29, 1945 |
| 2,484,913 | Snell | Oct. 18, 1943 |

FOREIGN PATENTS

| Number | Country | Date |
|---|---|---|
| 365,585 | Great Britain | Jan. 21, 1932 |